United States Patent [19]

Tiller et al.

[11] Patent Number: 5,588,974

[45] Date of Patent: Dec. 31, 1996

[54] PROCESS, AND APPARATUS, FOR THE INJECTION OF PREHEATED OXYGEN INTO A HIGH TEMPERATURE REACTOR

[75] Inventors: Mark L. Tiller; James H. Taylor; Geoffrey R. Say; Norman J. Eger; Lawrence J. Delaune; Gerald A. Wilcox, all of Baton Rouge, La.

[73] Assignee: Exxon Research and Engineering Company, Florham Park, N.J.

[21] Appl. No.: 416,622

[22] Filed: Apr. 4, 1995

[51] Int. Cl.$^6$ .................................................. B01J 8/18
[52] U.S. Cl. ........................... 48/127.9; 48/94; 48/95; 48/198.7; 252/373; 422/139
[58] Field of Search ............................. 48/94, 95, 127.7, 48/127.9, 198.7; 422/139; 252/373

[56] References Cited

U.S. PATENT DOCUMENTS

| 3,227,527 | 1/1966 | Heinze et al. | 48/127.9 |
|---|---|---|---|
| 3,477,824 | 11/1969 | Reed | 48/127.9 |
| 3,933,445 | 1/1976 | Mueller et al. | 48/197 |
| 4,595,145 | 6/1986 | Pratt et al. | 239/558 |
| 5,326,550 | 7/1994 | Adris et al. | 48/127.9 |
| 5,372,791 | 12/1994 | Abdulally | 422/139 |
| 5,405,219 | 4/1995 | Wang | 422/139 |
| 5,421,842 | 6/1995 | Shabaker et al. | 252/373 |

FOREIGN PATENT DOCUMENTS

| 0335668 | 4/1989 | European Pat. Off. | C01B 3/44 |

OTHER PUBLICATIONS

Woldman's Engineering Alloys, 7th Edition, Edited by John P. Frick, PhD, pp. 644–645.

Scripta Metallurgica, vol. 23, No. 1, 1989, USA pp. 59–64, XP002007998, M. C. Pandey et al.: "Effect of Prior Air exposure at Elevated Temperatures on the Creep Behavior of Inconel 600".

Primary Examiner—Timothy McMahon
Attorney, Agent, or Firm—Llewellyn A. Proctor; Jay Simon

[57] ABSTRACT

Process, and apparatus, for the production of hydrogen and carbon monoxide in a reactor, preferably one containing a bed of a particulate solids catalyst, or catalyst and solids diluent, by contacting and reacting within the reaction zone a low molecular weight hydrocarbon feed, steam and oxygen, or a low molecular weight hydrocarbon feed and oxygen, at high temperature. An oxygen stream preheated to high temperature is fed via a nozzle inlet, or inlets, into the reactor, while the hydrocarbon and steam, or hydrocarbon, is fed via a different nozzle inlet, or inlets, into the reactor. Preferred oxygen nozzle designs are constituted of nickel-chromium-iron alloys, especially Inconel 600, and Inconel alloys of the 600 series generally. The oxygen nozzle is comprised of a tubular body with inlet, and outlets of special design, which renders the nozzle especially useful in the intensely hot oxygen environment.

14 Claims, 3 Drawing Sheets

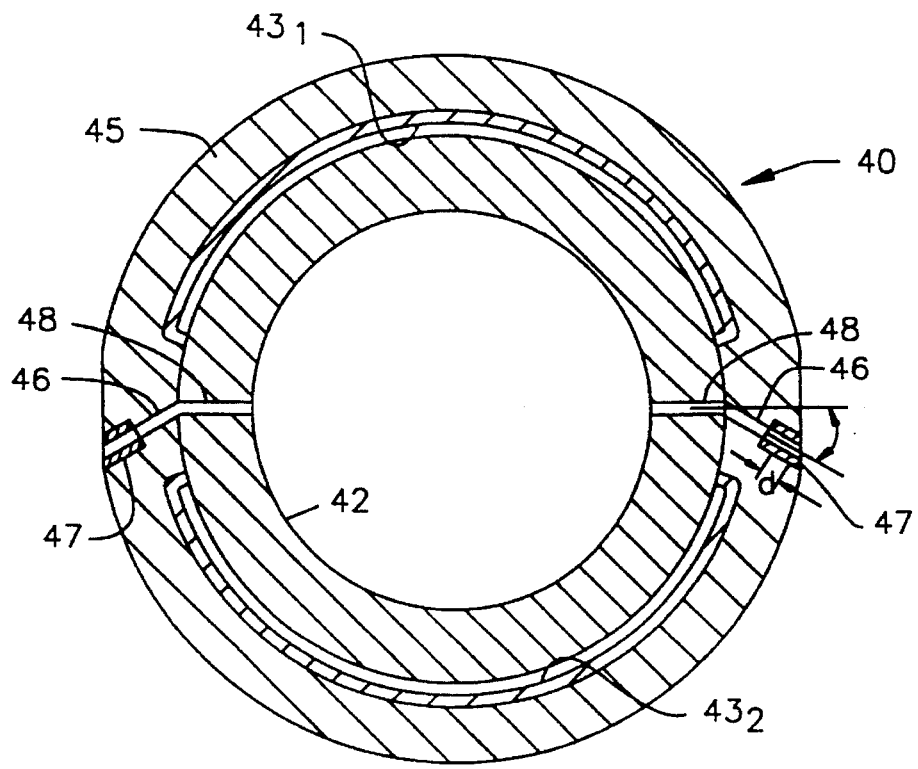
FIG. 5
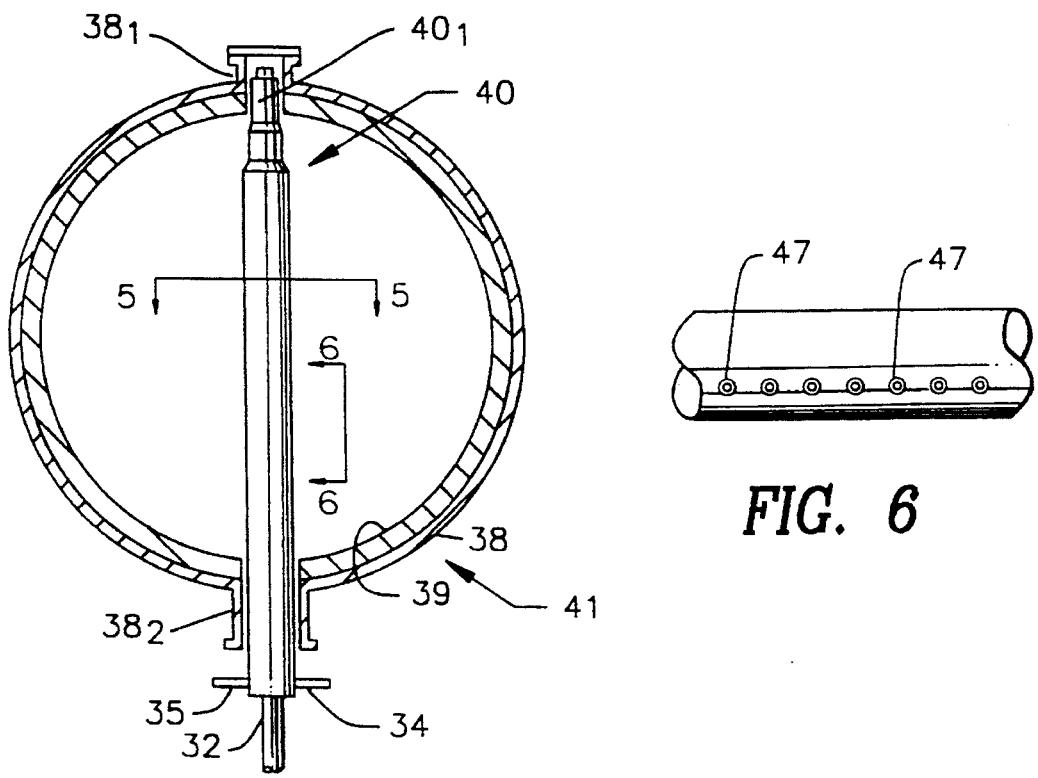
FIG. 4
FIG. 6

PROCESS, AND APPARATUS, FOR THE INJECTION OF PREHEATED OXYGEN INTO A HIGH TEMPERATURE REACTOR

FIELD OF THE INVENTION

This invention relates to improvements in process, and novel apparatus, for feeding high purity preheated oxygen into a high temperature reactor wherein a hydrocarbon feed is reacted with steam and oxygen, or with oxygen, to produce hydrogen and carbon monoxide.

BACKGROUND

High purity oxygen, particularly preheated oxygen, is a very reactive agent often used as an oxidant in the chemical and refining industries. A high grade metal pipe carrying a stream of preheated oxygen on discharge to a reaction zone however, can be ignited, burned, and completely destroyed; or its temperature may be increased to a level where the pipe becomes structurally weakened and unsafe. To avoid these intolerable conditions, in current practice the maximum preheat temperature for oxygen is about 500° F.

In a fluid bed syn gas generation (FBSG) process, a process wherein syn gas (hydrogen and carbon monoxide) is produced by reaction at high temperatures within a fluidized bed of catalyst, or catalyst and solids diluent, between low molecular weight hydrocarbons, steam and oxygen, it is particularly advantageous to preheat the oxygen feed to temperatures above 500° F. The use of a more highly preheated oxygen feed would provide a more efficient source of process heat, and less oxygen would be consumed in the process; since both process heat and oxygen consumption are significant cost factors.

Oxygen consumption is thus set not only by stoichiometry, but also by a technique, or device for safely introducing the oxygen into the reactor at temperatures above 500° F. For an FBSG reactor operating at a given temperature, the amount of oxygen required is inversely proportional to the amount of preheat applied to the various feed streams. Less oxygen is required in a process wherein the oxygen entering the reactor is preheated above 500° F. than in a process wherein the oxygen entering the process is preheated to temperatures less than 500° F. Moreover, because excess fuel is usually available at the site to preheat the oxygen to a temperature above 500° F., the net effect is a lower cost process (less oxygen consumed and better utilization of excess fuel).

INVENTION

The invention relates to improvements in a process, and apparatus, for the production of hydrogen and carbon monoxide in a reaction zone by contact between a low molecular weight hydrocarbon feed, steam and oxygen, or between a low molecular weight hydrocarbon feed and oxygen, at high temperature, ranging generally from about 1500° F. to about 2500° F., and higher, most often from about 1500° F. to about 2000° F., to produce steam reforming or partial oxidation reactions, or both partial oxidation and steam reforming reactions. In the process, oxygen, of purity ranging from about 50 percent to about 100 percent, preferably from about 75 percent to about 90 percent, or greater, by volume, preheated to temperatures ranging above 500° F. to about 1200° F., preferably from about 600° F. to about 1000° F., is fed into the reaction zone through a reactor nozzle inlet comprising a tubular body constituted of an alloy composition comprising at least about 70 percent nickel, preferably at least about 72 percent nickel, and more preferably from about 70 percent to about 80 percent nickel, from about 13 percent to about 17 percent chromium, preferably from about 14 percent to about 17 percent chromium, and from about 5 percent to about 12 percent iron, preferably from about 6 percent to about 10 percent iron, based on the total weight of the alloy composition, sufficient to withstand the oxidizing heat of the preheated oxygen without igniting and burning the alloy composition. Inconel 600, and other nickel base alloys of the 600 series, are exemplary of such alloys.

The oxygen reactor nozzle, or oxygen reactor nozzle inlet, in all embodiments, is comprised of a tubular body, preferably constituted of an alloy composition, the axial opening through which is provided with an inlet, or inlets, for the introduction of preheated oxygen, and an outlet, or outlets, within the tubular body to which is communicated a plurality of small diameter tubes constituted, preferably, of a nickel-chromium-iron alloy of composition similar to that of which said tubular body is constructed. The terminal ends of each of the small diameter tubes is fitted and covered with concentric refractory sleeves which project outwardly beyond the terminal end, or tip of each small diameter tube to protect the terminal end of the tubes from the high temperatures in the reactor which could cause mechanical weakening, burning of the alloy, and possible solids formation at the tips of the small diameter tubes. In a first preferred embodiment, one or more of the oxygen reactor nozzles is vertically oriented and the axial opening through the tubular body of an oxygen reactor nozzle is on center or parallel with the center line, or major axis, of the reactor and projected upwardly from the bottom of the reactor into the high temperature reaction zone. In this vertical configuration, each of the small diameter tubes are circumferentially, or concentrically arrayed about the outlet from the oxygen reactor nozzle and inclined downwardly at angles, measured from a line perpendicular to the axial opening through the tubular body, ranging from about 15° to about 60°, preferably from about 25° to about 45°. Generally, from about 2 to about 36, and preferably from about 10 to about 30 of the small diameter tubes are employed in an oxygen reactor nozzle of vertical orientation.

In a second preferred embodiment, the oxygen reactor nozzle, or nozzle inlet, is horizontally oriented with respect to the center line of the reactor, and one or more oxygen reactor nozzles are projected through the side wall into the reactor at the same or at different levels of elevation. Each oxygen reactor nozzle is constituted of a tubular body, the axial opening through which is provided with an oxygen inlet, or inlets, and an oxygen outlet, or outlets, comprised of a plurality of small diameter tubes, corresponding generally in composition with those employed in the vertically oriented oxygen reactor nozzle design. The small diameter tubes are arrayed along the length of the tubular body between the proximate and distal ends of the tubular body, preferably at spaced intervals ranging from about 1.0 inch to about 12 inches apart, more preferably at intervals ranging from about 1.5 inches to about 3.0 inches apart. Each of the nozzles is inclined downwardly at angles ranging from about 15° to about 60°, preferably from about 25° to about 45°, measured from a line perpendicular to the axial opening through the tubular body of a nozzle. The terminal ends of each of the small diameter tubes is fitted and covered with concentric refractory sleeves which project outwardly beyond the terminal end, or tip of each small diameter tube, and essentially the whole of the oxygen reactor nozzle is covered with a refractory. In both oxygen reactor nozzle designs, essentially the whole of the oxygen reactor nozzle is encapsulated in a refractory material.

The characteristics of a preferred process, and preferred oxygen reactor nozzles, as well as their principle of operation, will be more fully understood by reference to the following detailed description, and to the attached drawings to which reference is made in the description. The various features and components in the drawings are referred to by numbers, similar features and components being represented in the different figures by similar numbers. Subscripts are used in some instances with numbers where there are duplicate features and components, or to designate a sub feature or component of a larger assembly.

REFERENCE TO THE DRAWINGS

FIG. 4 depicts in an FBSG reactor vessel, in cross section, an oxygen reactor nozzle, representative of a second embodiment, horizontally aligned within the reactor;

FIG. 5 depicts a cross-section through section 5—5 of the nozzle of FIG. 4; and

FIG. 6 depicts a fragmentary side view of the nozzle of FIG. 4 viewed from line 6—6.

DETAILED DESCRIPTION OF THE INVENTION

Figure 1:
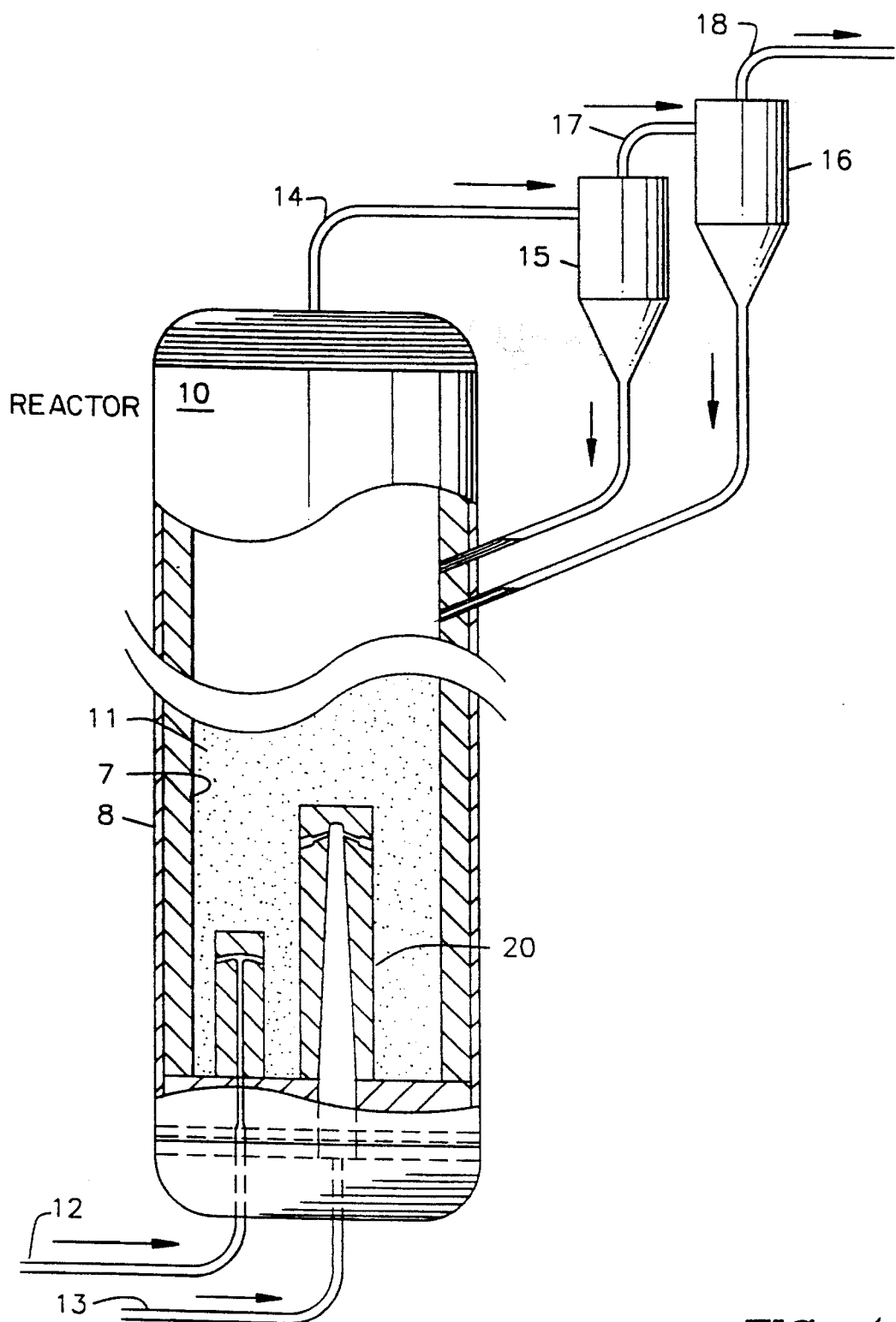
FIG. 1 depicts a preferred process, and apparatus, for the practice of this invention. In the figure, the numeral 10 refers to an FBSG, or fluidized bed syn gas reactor, and the numeral 20 to a preferred oxygen reactor nozzle (or plurality of oxygen reactor nozzles) the tubular body of which is vertically aligned on the center line (or parallel with the center line) of the reactor.

Referring to FIG. 1, synthesis gas is produced in reactor 10 containing a fluidized bed 11 wherein partial oxidation and steam reforming reactions are carried out simultaneously. The fluidized bed contains a particulate solid catalyst, and generally also a particulate solids diluent to disperse heat, suitably high purity alpha alumina. Generally, the bed is constituted of from about 10 percent to about 99.9 percent, preferably from about 80 percent to about 99.5 percent, of the solids diluent component and from about 0.1 percent to about 90 percent, preferably from about 0.5 percent to about 20 percent, of the catalyst, based on the total weight of the particulate solids constituting the fluidized bed.

Hydrogen and carbon monoxide are formed by reaction between a low molecular weight hydrocarbon, or hydrocarbons, suitably a mixture of $C_{1-C4}$ alkanes, predominantly methane, e.g., natural gas, steam, and oxygen, over a fluidized bed of nickel-on-an alumina based catalyst, or catalyst and solids diluent, at temperatures ranging from about 1500° F. to about 2000° F., preferably from about 1700° F. to about 1850° F., in a net reducing atmosphere.

The hydrocarbon is fed generally in admixture with steam into the fluidized bed 11 of the reactor 10 via one or a plurality of lines 12 located at the bottom of the reactor, and oxygen is fed via a separate line 13, or plurality of lines, into oxygen reactor nozzle 20 (or plurality of oxygen reactor nozzles 20); a hot "flame" zone, or flame zones, being created at locations wherein the oxygen enters the bed 11 via the nozzle outlets thereof. A hydrogen and carbon monoxide product, steam, carbon dioxide, some unconverted hydrocarbons, and other products exit overhead line 14, cyclone separator 15, overhead line 17, and cyclone separator 16 to trap some of the catalyst particles and fines, returning them via their respective diplegs to the fluidized bed 11 of the reactor. Syn gas is removed from the reactor 10 via line 18. In terms of bed dynamics, at least about 80 percent by weight to about 95 percent by weight of the particles of the bed are of mean average diameters ranging from about 20 microns to about 130 microns, preferably from about 30 microns to about 110 microns.

Figure 2A:
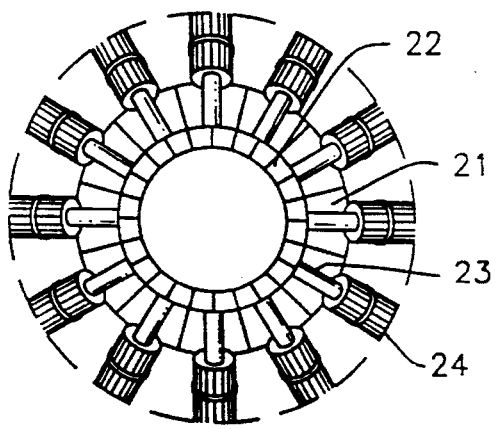
FIG. 2A depicts a view of the reactor nozzle as viewed from above.

The details of construction of the vertically oriented oxygen reactor nozzle 20 are described by reference to FIGS. 2, 2A and 3. The reactor nozzle 20 is constituted of a tubular metal body 21, a relatively large diameter base and a smaller diameter upper body portion, the axial opening at the very top of which is capped by a metal cap, or cover 22. Just below the apex there is provided a plurality of circumferentially arrayed openings within which there are fitted downwardly directed small diameter metal tubes 23, the terminal or distal ends of which are concentrically fitted with refractory tubular sheaths, or sleeves 24. The lower, or terminal base end, of the tubular body of the nozzle 20 is affixed within a collar or ranged pipe section (not shown) in a rigid upright position and projected through an opening within the bottom of the reaction vessel 10 below the refractory 26 which aligns the bottom of the vessel. The whole of the nozzle 20 is encapsulated within a refractory 25 to protect the nozzle from the temperature of the reaction vessel. The line 13 is connected to the lower terminal end of the tubular metal body 21, the open terminal end thereof being projected through an opening within the bottom of the reaction vessel. Oxygen flows through line 13 upwardly through the axial opening of the tubular metal body 21, and outwardly through the downwardly directed small diameter metal tubes 23 into the fluidized bed 11 of the reactor 10.

The number of small diameter metal tubes 23 generally numbers from about 2 to about 36, preferably from about 10 to about 30 (per oxygen nozzle 20). The tubes 23 can be divided and arrayed, or arranged in one or more levels relative to their location on the tubular metal body 21. Where the tubes are provided at more than one level, i.e., at multiple levels, the total number of tubes employed within the tubular body is generally increased.

Figure 2:
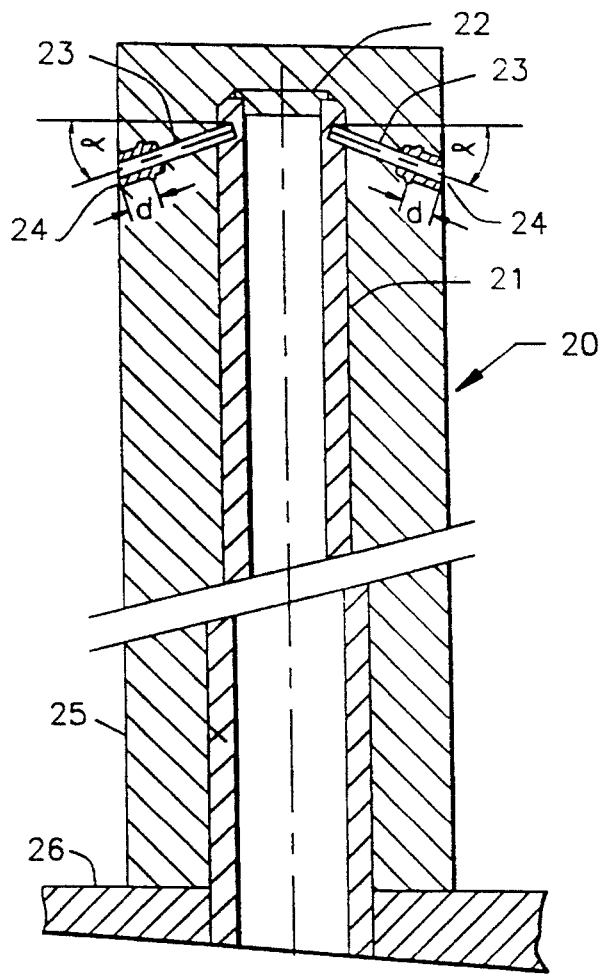
FIG. 2 depicts in cross-section this preferred oxygen reactor nozzle.
Figure 3:
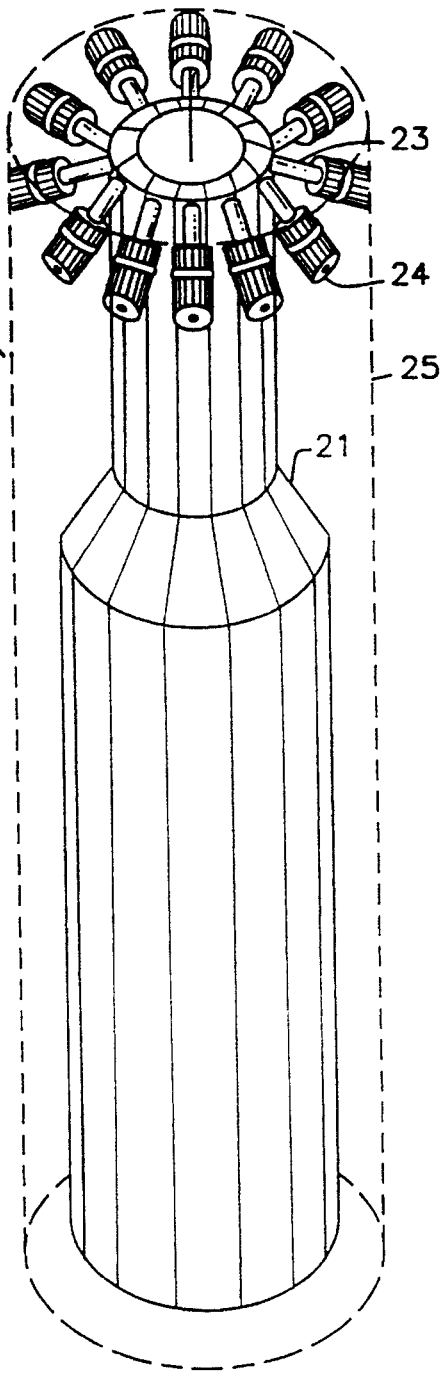
FIG. 3 is an isometric view of this preferred oxygen reactor nozzle.

The small diameter metal tubes 23, in this instance twelve in number, located at the same level, and radially separated one from another by 30° intervals, are each inclined downwardly at an angle alpha, $\alpha$, measured from a line perpendicular to the axial opening through the tubular body 21 of the nozzle 20 (FIG. 2). The angle of declination, $\alpha$, is critical, and ranges from about 15° to about 60°, preferably from about 25° to about 45°. Angles of these magnitudes, particularly the latter, inhibit entry of solids particles into the nozzle outlets, and suppress penetration of the jetted oxygen stream into the bed 11. In fitting the refractory tubular sheaths, or sleeves 24 upon the terminal, or distal ends of the small diameter metal tubes 23, it is also critical that the distance d, or distance between the tip, or terminal end of a refractory sleeve 24 and outer terminal end of a small diameter metal tube 23 be at least equal to the inside diameter of a small diameter tube 23, preferably from about 1 to about 10, more preferably from about 2 to about 6, times the inside diameter of a small diameter tube 23. The temperature at the terminal end of a metal tube 23, by selection of the proper value for d, is thus maintained close to that of the entering preheated oxygen, which is considerably cooler than the temperature at the location of entry of the oxygen into the fluidized bed. The value of "d" for a given metal tube 23, it will be realized, will vary to some extent, dependent on the temperature of the preheated oxygen, the rate of flow of oxygen through the metal tube 23, and the purity of the oxygen which enhances oxidation and burning of a part of the entering feed as a fuel; as well as by the insulating value provided by a refractory tubular sheath, or sleeve 24 itself, and the additional refractory 25. A sufficiently low tube temperature prevents the metal from becoming weakened, and suppresses deposits forming on the tip, or terminal end of the metal tube 23.

Referring to the Table, a refractory tubular sleeve 24 is preferably constituted of a mixture of AA-22 refractory (or similar material characterized as an air-setting phosphate bonded high alumina refractory which sets at room temperature, as manufactured by Resco Products, Inc.) plus a mortar material containing a refractory chromic oxide phosphate bonded component. Examples of suitable chromic oxide phosphate bonded materials include:

Jade Set Super made by A. P. Green with 9–10% chromic oxide; and Ruby Mortar made by Harbison-Walker with about 17% chromic oxide.

A chemical analysis for each of the refractories expressed in terms of weight percent, calcined basis, is given in the Table as follows:

TABLE

|  | Jade Set Super | Ruby Mortar | Resco AA-22 |
| --- | --- | --- | --- |
| Silica, $SiO_2$ | 1.0–2.0 | 0.1 | 0.7 |
| Alumina, $Al_2O_3$ | 88.0–90.0 | 74.0 | 89.6 |
| Iron oxide, $Fe_2O_3$ | 0.05–0.2 | 0.2 | 0.05 |
| Lime, CaO | Trace–0.1 | — | |
| Magnesia, MgO | 0.05–0.2 | — | $0.05^{(1)}$ |
| Alkalies, $Na_2O + K_2O$ | 0.1–0.3 | — | |
| Chromic Oxide, $Cr_2O_3$ | 9.0–10.0 | 17.7 | 0.0 |
| Phosphorous Pentoxide, $P_2O_5$ | — | 7.4 | 6.2 |

Note
$^{(1)}$: Total Lime, Magnesia and Alkalies approximates 0.05.

The two refractories are generally mixed together in concentrations wherein the AA-22 component ranges from about 50 percent to about 75 percent, and the chromic oxide material, i.e., the Jade Set Super or Ruby Mortar, ranges from about 50 percent to about 25 percent, based on the weight of the composition. The most preferred mixture is one which contains from about 75 percent AA-22 and about 25 percent of the chromic oxide material.

Castings can be made from mixtures of the AA-22 and one of the chromic oxide materials which will harden at room temperatures, and the castings then easily separated from the molds. In addition, the mixtures made from the two refractories have a sufficiently high thermal expansion which allows the small diameter metal tubes 23 to be encapsulated or encased without causing excessive stress in the refractory. The mixture of the two refractories also shows less tendency to crack when heated than other refractories. Further, the mixture of the two refractories is erosion resistant, thermal shock resistant, and has good corrosion resistance to high temperature slags. In contrast, tubular sleeves 24 made from the refractory chromic oxide phosphate bonded mortar alone are characterized by pockets and laminations, which occurs during the drying process, and tubular sleeves 24 made from the high alumina refractory are characterized by the presence of cracks; flaws which do not appear in the blend of refractory compositions.

The tubular metal body 21 and small diameter metal tubes 23 of the oxygen reactor nozzle 20 are preferably constituted of nickel-chromium-iron alloys, i.e., alloys comprised of nickel, chromium and iron, the components of which given in terms of weight percent concentration, based on the total weight of the alloy, are as follows:

| Metallic Component of Alloy | Wt. % Metallic Component Preferred | Wt. % Metallic Component More Preferred |
| --- | --- | --- |
| Nickel | ≧70 | 70–80 |
| Chromium | 13–17 | 14–17 |
| Iron | 5–12 | 6–10 |

These nickel base alloys are generally members of the 600 alloy series, including Alloy 600, 690, and the like, INCONEL 600, an alloy containing about 78 wt. % nickel, from about 14 wt. % to about 17 wt. % chromium, and from about 6 wt. % to about 10 wt. % iron, being a particularly preferred alloy for use in the practice of this invention. A key and novel feature of the vertically oriented oxygen reactor nozzle is that it does not require a steam or air cooling jacket as used in other oxygen nozzles.

FIGS. 4, 5 and 6 show another embodiment of the oxygen nozzle (or plurality of oxygen reactor nozzles); the nozzle in this instance being horizontally aligned with respect to the axis, or center line of the reactor. Referring to FIG. 4 there is depicted a plan view cross-section of an FBSG reaction vessel 41 across, and through the side wall 38, and refractory lining 39, of which is mounted an oxygen nozzle 40. One terminal end 401 of the nozzle 40 may rest upon a support (not shown) to allow for movement during thermal expansions and contractions, and access to the nozzle may be provided via a flanged opening 38$_1$ which is provided with a removable cover plate. The opposite terminal end of the nozzle 40 is projected through the side wall of the reactor 41 via a flange opening 38$_2$, oxygen being input into the reactor 41 via line opening 32. Due to the intense heat of the reaction and perhaps to a relatively large diameter vessel wall 38, a steam jacket 43 can be provided; a steam coolant being input into the jacket 43 (FIG. 5) via a line 34, and hot steam is removed via a line 35 after the input steam coolant has flowed through the jacket and returned.

Reference is made specifically to FIG. 5 which depicts section 5—5 through oxygen nozzle 40. Oxygen nozzle 40 is constituted of a tubular metal body, or pipe 42, preferably a nickel-chromium-iron alloy, especially an INCONEL 600 tubular metal pipe, a steam jacket 43 which provides upper and lower channels 43$_1$, 43$_2$, respectively, for the input and recycle of the coolant steam, and an external surrounding refractory coating 45 which, preferably, corresponds in composition to the refractory 25 which covers the oxygen nozzle described with reference to FIGS. 1–3. One or a plurality of horizontally oriented openings 48, two alternately disposed rows of openings 48 being shown, are provided along the lateral length of the metal tubular body, or pipe 42. The outer side of each opening is connected to a downwardly directed relatively small diameter metal tube 46, the composition of which preferably corresponds to that of the tubular metal body, or pipe 42. A concentrically fitted sleeve 47 is located upon, and surrounds the distal, or each terminal end of a small diameter metal tube 46, respectively. The tapered front end or face of a sleeve flushes with the outer surface of the refractory 45. The small diameter tubes are arrayed along the length of the tubular body, generally at equal distances apart, suitably at intervals ranging from about 1.0 inch to about 12 inches, preferably from about 1.5 inches to about 3.0 inches apart.

Continuing the reference to FIG. 5, it will be observed that each of the small diameter metal tubes 46 is inclined downwardly at an angle alpha, α, which, measured from a line perpendicular to the axial opening through the tubular body 42 of the nozzle 40, ranges from about 15° to about 60°, preferably from about 25° to about 45°. Also, the terminal end of each concentrically fitted refractory sleeve 47 extends outwardly beyond the terminal end, or tip, of each small diameter metal tube 46 to a distance, d, which is equal to at least the diameter of a small diameter metal tube 46. Preferably "d" ranges from about 1 to about 10, and more preferably from about 2 to about 6, times the diameter of a small diameter metal tube 46. Essentially the whole of the tubular body 42, steam jacket 43, and small diameter metal tube 46 are encapsulated by the refractory 45. FIG. 6 depicts a side fragmentary view of a short length of the nozzle 40.

The invention will be more fully understood by reference to the following selected non limiting examples which illustrate the more salient features of an operation embodying preferred oxygen reactor nozzles.

EXAMPLE 1

Metal burning tests were conducted to demonstrate the superior stability of an oxygen reactor nozzle constructed of INCONEL 600, as contrasted with oxygen reactor nozzles constructed of 304 S.S. and Monel steels. The tests were conducted by procedures similar to those described in "Flammability and Sensitivity of Materials in Oxygen-Enriched Atmospheres," 2nd Volume, ASTM STP 910, M. A. Benning, Editor. Specific reference is made to "Burn Propagation Rates of Metals and Alloys in Gaseous Oxygen" by F. J. Benz, R. C. Shaw, and J. M. Homa at Pages 135–152.

In comparing the performance of INCONEL 600 with other stainless steels it has been found that this alloy can withstand considerably higher temperatures in the presence of preheated oxygen than, e.g., such steels as 304 S.S. and MONEL. Thus, the minimum temperature in ° F. at which upward burning was sustained, in the presence of 400 p.s.i.a. oxygen, for 304 S.S. and INCONEL 600 was found to be 1000° F. and 2120° F., respectively, as listed below. Whereas MONEL did not ignite at temperatures up to 1100° F., the highest temperature at which it was tested, it had lost most of its useful strength by the time the temperature reached 1100° F.

| Alloy | Minimum Temperature At Which Upward Burning Is Sustained, °F. |
|---|---|
| 304 S.S. | 1000° |
| MONEL | 1100°[1] |
| INCONEL 600 | 2120° |

Note
[1]: Loses strength at temperatures above 1100° F.

While these tests are not a direct indication of the absolute level of temperature that burning can be sustained in a commercial type installation, the results do indicate the superiority of INCONEL 600. Consequently, considering that the 304 S.S. and MONEL metals can safely withstand oxygen preheated to about 500° F. in conventional practice, the INCONEL 600 can safely withstand oxygen preheated to about 1000° F., or greater. In FBSG and partial oxidation processes, e.g., oxygen preheated to 1000° F. can be passed through an INCONEL 600 nozzle inlet into a reaction zone and reacted with hydrocarbon and steam, or with a hydrocarbon, respectively; and the hydrocarbon and steam, or hydrocarbon, can be fed into the reaction zone via different nozzle inlets than those through which the preheated oxygen is fed.

EXAMPLE 2

A large FBSG pilot plant reactor was operated with an oxygen reactor nozzle similar to that described with reference to FIGS. 1, 2, 2A and 3; separate hydrocarbon feed gas and oxygen reactor nozzles, respectively, being used to direct the gas streams into the fluidized bed of the reactor. The reactor contained a mixture of particulate catalyst and solids diluent heat transfer particles. In the operation, the hydrocarbon feed gas was constituted of a mixture of natural gas, steam and carbon dioxide. The oxygen gas stream also contained some steam and carbon dioxide, the reaction operating at 1750° F. and 350 psig to produce hydrogen and carbon monoxide via the steam reforming, and partial oxidation reactions. The composition of the feed to the reactor was as follows:

| Hydrocarbon Feed Gas Stream | |
|---|---|
| Moles of Natural Gas | 1.00 |
| Moles Steam/Moles Natural Gas | 0.53 |
| Moles $CO_2$/Moles Natural Gas | 0.05 |
| Oxygen Gas stream | |
| Moles $O_2$/Moles Natural Gas | 0.54 |
| Moles Steam/Moles Oxygen | 0.26 |
| Moles $CO_2$/Moles Oxygen | 0.17 |

The normal gas composition exiting the FBSG reactor had the following gas composition:

| Component | Mole % |
|---|---|
| $CH_4$ | 4 |
| CO | 21 |
| $H_2$ | 45 |
| $CO_2$ | 8 |
| $H_2O$ | 22 |
| Total | 100 |

During the operation the hydrocarbon feed was preheated to 1000° F. and injected into the reactor. The oxygen stream was preheated to 400° F. and passed into the reactor via an oxygen reactor nozzle constructed of INCONEL 600 the outside tubular metal wall of which was heated to a temperature ranging between 1100° F. and 1200° F.; this providing an estimated temperature of 800° F. on the inside wall where the flowing stream of oxygen contacted the metal interface. Each nozzle tip of a small diameter metal tube of the oxygen reactor nozzle was oriented at a downward sloping angle of 30° from horizontal. All metal portions of the oxygen reactor nozzle were constructed of INCONEL 600, and the sleeves, or refractory tips of the oxygen reactor nozzles were constituted of a 50/50 mixture of Jade Set and AA-22 refractories. The small diameter metal tubes of the oxygen reactor nozzle were 0.277" I.D., and the tips of the metal tubes were 1.0 inch from the outer terminal end, or tip of the nozzle refractory, i.e., d=1.0/0.277 or 3.5.

Careful inspection of the INCONEL 600 oxygen reactor nozzle following shut down of the operation showed no evidence of burning or loss of structural integrity.

It is apparent that various modifications and changes can be made without departing the spirit and scope of the invention. Whereas, e.g., the drawings depict a single oxygen reactor nozzle mounted vertically or horizontally within a reactor, the number of oxygen reactor nozzles mounted within a single reactor will generally be greater than one dependent in large extent upon the size of the reactor. Thus, the depiction of a single oxygen reactor nozzle is for purposes of illustration, and in no way limits the number of oxygen reactor nozzles employed in a single reaction vessel.

Having described the invention, what is claimed is:

1. In a fluidized bed reaction vessel constituted of walls enclosing a reaction chamber, with outlets, and inlets for the introduction of a low molecular weight hydrocarbon feed, steam, and oxygen, or a low molecular weight hydrocarbon feed and oxygen, for reaction at temperatures ranging form about 1500° F. to about 2500° F., or higher, to produce hydrogen and carbon monoxide the improved combination comprising a nozzle inlet, or nozzle inlets, into the reactor through which high purity preheated oxygen can be introduced into the reaction chamber which comprises a tubular body constituted of an alloy sufficient to withstand the oxidizing heat of the preheated oxygen without igniting and burning the alloy composition, the axial opening providing an inlet for introducing the preheated oxygen, and an oxygen outlet, a plurality of small diameter tubes smaller than the axial opening, constituted of an alloy composition as defined by that of which said tubular body is constituted, communicated with said oxygen outlet, disposed upon the tubular body, and inclined downwardly at an angle, as measured from a line perpendicular to the axial opening through the tubular body, ranging from about 15° to about 60°, refractory sleeves concentrically fitted upon the small diameter tubes such that a terminal end thereof projects outwardly beyond the terminal end of a small diameter tube a distance, d, which is at least equal to the inside diameter of a small diameter tube, sufficient to suppress ignition, burning or weakening of the alloy by the high temperature, and solids formation at the tips of the small diameter tubes, and an encapsulating refractory which surrounds the tubular body, plurality of small diameter tubes, and refractory sleeves to protect the nozzle against the intense heats of reaction, while the low molecular weight hydrocarbon feed and steam, or low molecular weight hydrocarbon feed, is fed into the reaction chamber via a different nozzle inlet.

2. The apparatus of claim 1 wherein the tubular body of the nozzle and small diameter tubes communicated with the axial opening at the outlet end thereof are comprised of at least about 70 wt. percent nickel, from about 13 wt. percent to about 17 wt. percent chromium, and from about 5 wt. percent to about 12 wt. percent iron.

3. The apparatus of claim 1 wherein the tubular body of the nozzle and small diameter tubes communicated with the axial opening at the outlet end thereof are comprised of from about 70 wt. percent to about 80 wt. percent nickel, from about 14 wt. percent to about 17 wt. percent chromium, and from about 6 wt. percent to about 10 wt. percent iron.

4. The apparatus of claim 1 wherein the tubular body of the nozzle and small diameter tubes communicated with the axial opening at the outlet end thereof are comprised of an INCONEL 600 alloy.

5. The apparatus of claim 1 wherein from about 2 to about 36 of the small diameter tubes are radially disposed substantially at even intervals around the circumference of the tubular body, each is inclined downwardly at an angle, as measured from a line perpendicular to the axial opening through the tubular body, ranging from about 25° to about 45°, and the nozzle is vertically oriented as relates to the axial opening through the tubular body of the nozzle and the center line of the reactor.

6. The apparatus of claim 5 wherein from about 10 to about 30 of the small diameter tubes are so disposed, at even intervals, around the circumference of the tubular body.

7. The apparatus of claim 1 wherein the distance, d, between the terminal end of a small diameter tube and the terminal end of a refractory sleeve concentrically affixed thereon ranges from about 1 to about 10 times the inside diameter of the small diameter tube.

8. The apparatus of claim 7 wherein the distance, d, ranges from about 2 to about 6 times the inside diameter of the small diameter tube.

9. The apparatus of claim 1 wherein the refractory sleeves affixed upon the small diameter tubes are constituted of a mixture of an air-setting phosphate bonded high alumina refractory which sets at room temperature, and a mortar which contains a refractory chromic oxide phosphate bonded component.

10. The apparatus of claim 9 wherein the refractory composition constituting the refractory sleeves contains from about 50 wt. percent to about 75 wt. percent of the air-setting phosphate bonded high alumina refractory, and from about 50 wt. percent to about 25 wt. percent of the mortar which contains the refractory chromic oxide phosphate bonded component.

11. The apparatus of claim 1 wherein the small diameter tubes are disposed at intervals ranging from about 1.0 inch to about 12 inches along the length of the tubular body, between its proximate and distal end, each is inclined downwardly at an angle, as measured from a line perpendicular to the axial opening through the tubular body, ranging from about 25° to about 45°, and the nozzle is horizontally disposed as relates to the axial opening through the tubular body of the nozzle and the center line of the reactor.

12. The apparatus of claim 11 wherein the small diameter tubes are disposed at intervals ranging from about 1.5 inches to about 3.0 inches apart along the length of the tubular body.

13. The apparatus of claim 11 wherein the tubular body of the nozzle and small diameter tubes are comprised of from about 70 wt. percent to about 80 wt. percent nickel, from about 13 wt. percent to about 17 wt. percent chromium, and from about 5 wt. percent to about 12 wt. percent iron.

14. The apparatus of claim 11 wherein the tubular body of the nozzle and small diameter tubes are comprised of an INCONEL 600 alloy.

\* \* \* \* \*